Figure 1:
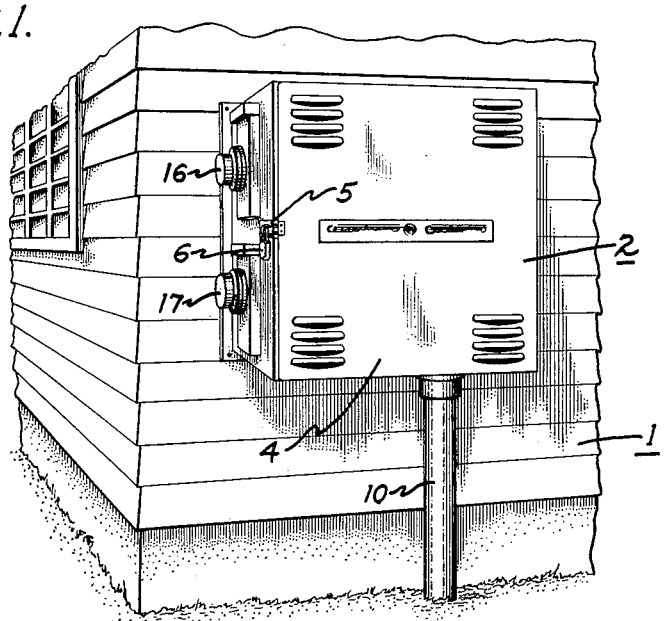

March 13, 1962  B. V. GIEGERICH  3,025,432
FACTORY ASSEMBLED ELECTRICAL SERVICE PACKAGE
Filed Jan. 16, 1959  3 Sheets-Sheet 1

Inventor,
Bertrand V. Giegerich,
by Gilbert P. Tarleton
His Attorney.

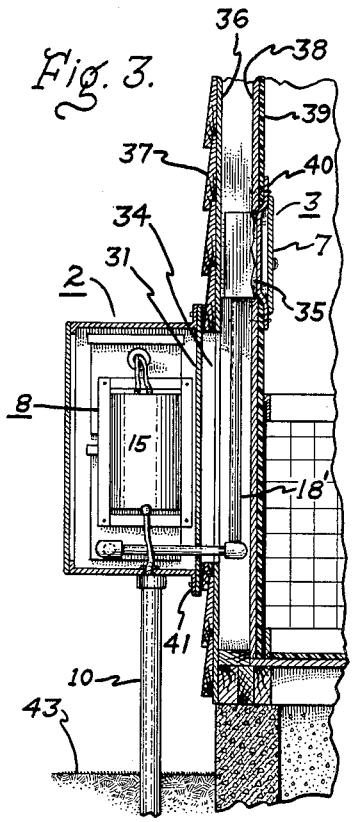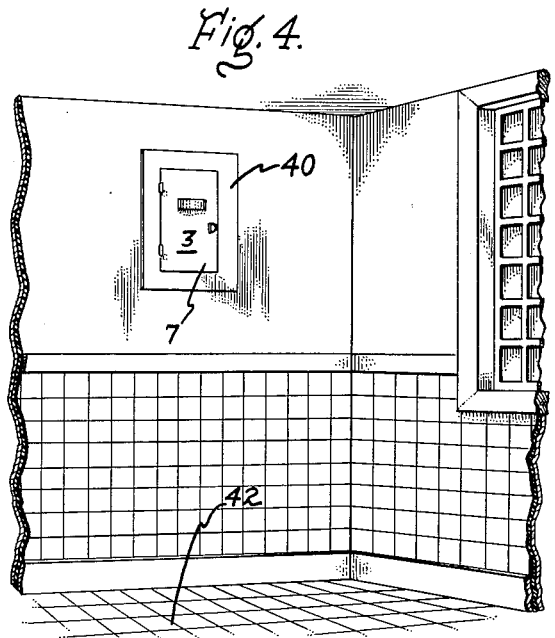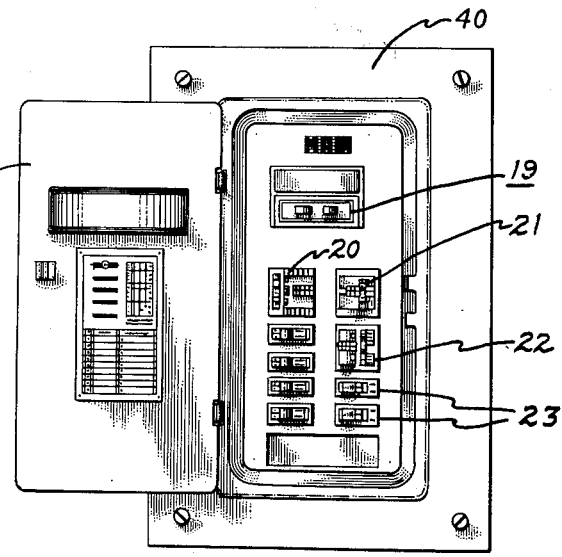

March 13, 1962 B. V. GIEGERICH 3,025,432
FACTORY ASSEMBLED ELECTRICAL SERVICE PACKAGE
Filed Jan. 16, 1959 3 Sheets-Sheet 3
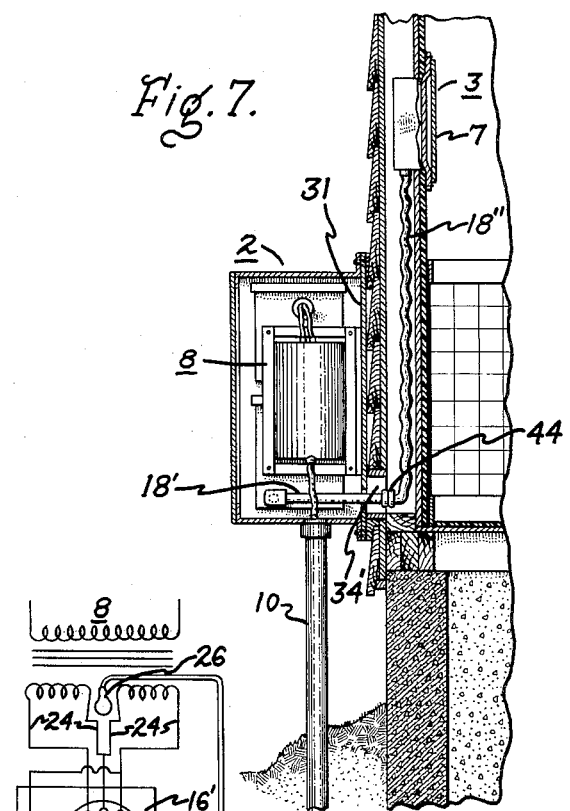
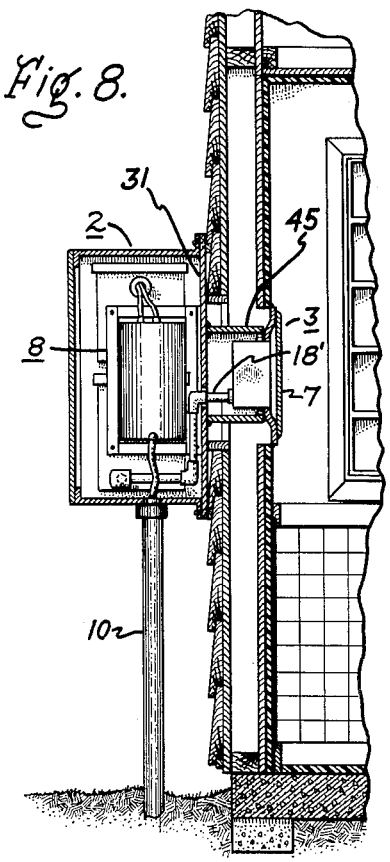
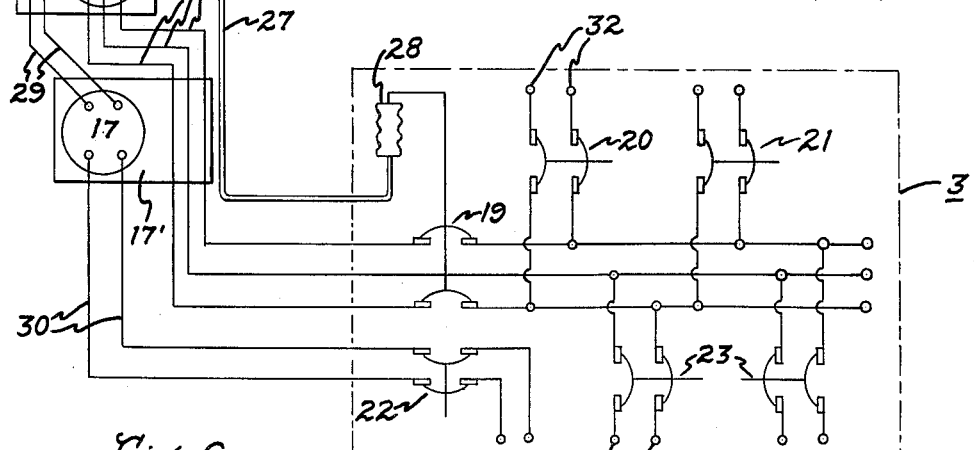
Inventor,
Bertrand V. Giegerich,
by [signature]
His Attorney.

United States Patent Office 3,025,432
Patented Mar. 13, 1962

3,025,432
FACTORY ASSEMBLED ELECTRICAL SERVICE
PACKAGE
Bertrand V. Giegerich, Pittsfield, Mass., assignor to General Electric Company, a corporation of New York
Filed Jan. 16, 1959, Ser. No. 787,153
9 Claims. (Cl. 317—99)

This invention relates to electrical equipment for providing home owners with electrical service, and more particularly, to a package of such electrical equipment which is factory assembled.

One conventional way for an electrical utility to provide home owners with electrical service is for the electrical utility to run main feeder and distribution lines along a street on line poles. The voltage from the main feeder to the distribution lines is stepped down by distribution transformers on the line poles. This electrical equipment is owned by and installed by the electrical utility and includes electrical line insulators, lightning arresters and cutouts and may include voltage regulating equipment.

Electrical power is brought to the home owner from the distribution lines by electrical service lines which extend from the distribution lines to the house. The house end of the electrical service lines conventionally are dead ended to an upper part of the outside of the house. From there other electrical service lines come into the house through an electrical service entrance to a distribution box which contains switches or fuses or both. Conventionally one or more electrical power consumption meters which belong to the utility are mounted on the outside of the house in the service drop from the upper part of the house to the service entrance. These meters may be installed by the utility or home builder. However, the other equipment is owned by the home owner and is installed by the home builder. The house lines are connected to the distribution box and the switches or fuses are for controlling and protecting the house lines and home owner's electrical appliances and equipment connected thereto.

The above outlined way of providing home owners with electrical service is not economical for several reasons. It introduces losses in the distribution and service lines and problems of voltage regulation. Also, it does not make efficient utilization of materials and labor.

It is an object of this invention to provide a more economical way of providing home owners with electrical service.

I have discovered that this can be accomplished by providing a package of electrical equipment which is assembled at the factory. In my invention all the electrical equipment required between the main feeder and the house lines for providing the home owner with electrical power is coordinated, assembled, and electrically preconnected in factory assembly lines into an electrical service package. Where it is desired to eliminate overhead lines it is contemplated that a main feeder line be placed underground. Power can be brought from the main feeder line to a plurality of houses by an underground feeder loop which is connected to the main feeder line. Each electrical service package will include a distribution transformer and each home will be provided with an electrical service package. The transformer will step down the voltage from the main feeder loop to the customer's desired voltage of say 120 and 240 volts. The electrical service packages will include disconnecting and sectionalizing switches for connecting and disconnecting the transformers from the main feeder loop and for sectionalizing the main feeder loop to facilitate repair and maintenance work. Each package will also include one or more electrical power consumption meters and the customer's distribution box with switches or fuses or both. The switches or fuses will perform the same function as heretofore. However, preferably one of the switches will also serve as a transformer secondary protective switch. That is to say, it is coordinated with the transformer at the factory to be current and thermally responsive thereto so as to also serve as a protective circuit breaker for the transformer.

All of the foregoing electrical equipment of the electrical service package is coordinated, assembled and electrically preconnected at the factory. Therefore, in order to provide electrical service for the home owner it is only necessary to install the package at the house site and connect the house lines to the distribution box and the transformer to the main feeder loop. This makes several economies possible. For instance, heretofore some of the required electrical equipment for electrical service was installed separately at different places by the utility and the home builder. This increased labor costs. It also increased materials costs. That is to say, in the invention it is possible to eliminate the distribution and service lines. Elimination of these lines eliminates problems of voltage regulation and line maintenance and reduces line losses. In the invention further cost reductions are achieved by also eliminating the customer's electrical service enrtance and some of the line insulators, lightning arresters and cutouts. Eliminating some of the materials cost also eliminates the labor and other cost of their installation. Coordination, assembly and preconnection of equipment under factory assembly line controlled manufacturing procedures generally speaking is a low cost way of installing equipment, and this is true in my invention.

Figure 2:
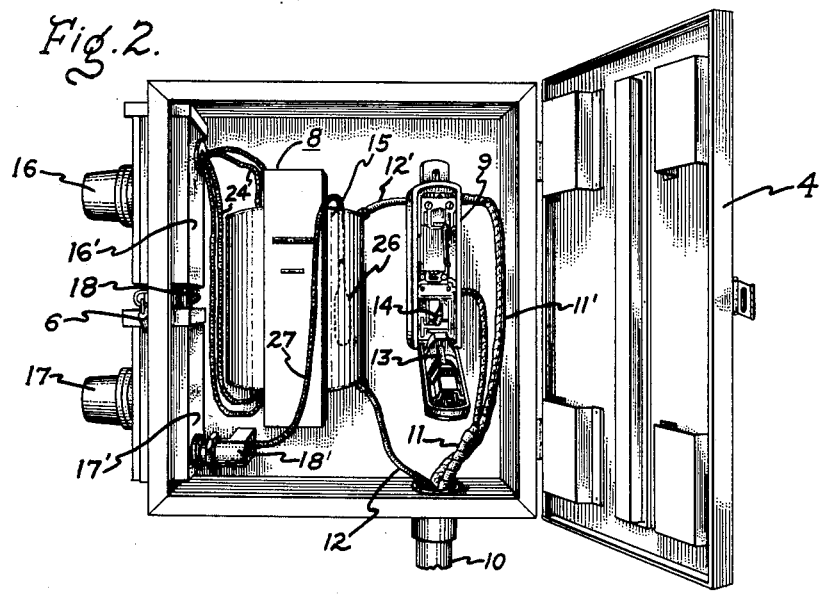

While the specification concludes with claims particularly pointing out and distinctly claiming the subject matter which I regard as my invention, it is believed the invention will be better understood from the following description taken in connection with the accompanying drawings in which:

FIG. 1 is a partly broken away perspective view of a house having one form of my invention installed therein, FIG. 2 is an enlarged front elevation view of the electrical service package of FIG. 1 showing the inside of the high voltage compartment, FIG. 3 is a partly broken away side view of the house and electrical service package of FIG. 1, FIG. 4 is a partly broken away perspective view of the inside of the house showing the front of the low voltage compartment or house distribution box, FIG. 5 is an enlarged front elevation view of the distribution box of FIG. 4 when its door is open, FIG. 6 is a diagrammatic illustration of the electrical circuit connections between the transformer and distribution box of the electrical service package, FIG. 7 is a side view similar to FIG. 3 showing a second form of the invention, and FIG. 8 is a side view similar to FIGS. 3 and 7 showing a third form of the invention.

Like reference numerals will be used in the several forms of the invention to indicate similar parts.

Referring now to FIGS. 1 to 5, shown therein is a side 1 of a house which has an electrical service package mounted thereon which comprises a high voltage compartment 2 and a low voltage compartment 3. The high voltage compartment 2 can be closed by a door 4 and contains the electrical utility's equipment. The door 4 can be locked closed by a latch 5 and padlock 6. The low voltage compartment 3 which is the home owner's distribution box can be closed by a door 7.

The compartment 2 contains a distribution transformer 8 and a transformer primary disconnect and feeder loop sectionalizing switch 9. An underground conduit 10 connected to the compartment 2 provides an entrance for two high voltage underground cables 11 and 11' and an underground ground cable 12. The cables 11 and 11' are connected to lower and upper terminals respectively of the switch 9. It is contemplated that the underground end of the cables 11 and 11' will be connected in an underground main feeder loop which in turn is connected to an underground main feeder line. Each electrical service package will have two primary cables 11 and 11' which are connected in the main feeder loop. That is to say, a plurality of electrical service packages will get their power from the same feeder loop by connecting their parts 11, 9, 11' in series in a loop. This type of loop power system is understood by those skilled in the arts and facilitates repair and maintenance work. The part of the underground feeder loop which is connected to cable 11 can be sectionalized from the remainder of the feeder loop by opening switch 9. However, to disconnect the transformer 8 from the feeder loop it will be necessary to also isolate the part of the feeder loop feeder loop which is connected to cable 11'. This is done by opening another switch 9 which is connected to the other end of the cable 11'. This other switch will usually be at an adjacent house but its opening will not result in disconnection of its transformer from the feeder loop. In this manner it is possible to sectionalize one or more parts of the underground loop and disconnect one or more transformers without interrupting continuity of electrical service at other homes. It is necessary to open two switches to disconnect a transformer because opening of switch 9 still leaves the transformer energized. That is, one end of the primary or high voltage side or winding of the transformer 8 is connected to cable 11' by a cable lead 12' which connects with cable 11' at the upper terminal of the switch. The other end of the primary or high voltage side or winding of the transformer 8 is grounded by connection to underground ground cable 12.

The switch 9 is opened and closed by a switch blade 13 and since the switch 9 is required to interrupt high currents at high voltages a cartridge of compressed insulating gas 14 is provided to assist in this function. This type of load break switch is described in detail in Carpenter et al. Patent 2,834,855 issued May 13, 1958 and assigned to the same assignee as the instant application. Although the invention is not restricted to a feeder loop and other types of primary switches can be used the disclosed arrangement is advantageous since it provides a convenient way of doing repair and maintenance work without any major interruptions in continuity of electrical service.

Preferably the windings of the transformer 8 are insulated by encapsulating them in an insulating resin 15 and the transformer is air cooled. Axial cooling ducts can be formed in the encapsulated windings to facilitate air cooling in a manner which is understood by those skilled in the arts. The transformer could be insulated and cooled by immersing it in an insulating and cooling liquid. However, this would increase the weight of the transformer and introduce the additional requirement of a tank for the liquid. A tank would reduce the amount of available free space in the compartment 2 for the other electrical equipment and working space for making electrical connections. However, if a liquid filled transformer is used preferably the liquid should be non-flammable to reduce the fire hazard.

The compartment 2 is provided with one or more electrical power consumption meters. The meter 16 can be a conventional watt-hour meter, and the meter 17 can be an off-peak timed watt-hour meter for the home hot water supply. Preferably the meters 16 and 17 are mounted so that they can be read from the outside of compartment.

The secondary or low voltage side or winding of the transformer can be divided into two sections, which is conventional practice, and cable leads 24 can be brought from these sections to meter terminals in panel 16' of the upper meter. From meter 16 connections extend through a conduit 18, the panel 17' of meter 17, and a conduit 18' to the customer's low voltage compartment or distribution box 3. These connections will be described now in connection with FIG. 6.

The leads 24 extend from the secondary sections of the transformer 8 into the panel 16' and are connected to the meter 16. The power which meter 16 measures is continuous power. This power is brought out of the meter 16 by lines 25. These lines go through the conduit 18 and through the panel 17' but without connection to meter 17. From panel 17' they go through the conduit 18' to distribution box 3. Box 3 contains 240 volt switches 20 and 21 for protecting 240 volt house lines and major appliances, and 120 volt switches 23 for protecting 120 volt house lines and minor appliances and lighting. It also contains a switch 19 for controlling and protecting all of these house lines and their electrical appliances and fixtures as well as the transformer. The details of these switches are not shown since they are well understood by those skilled in the art and are commodities that are available on the market. All of them can be made current sensitive by bimetallic or electromagnetic trip means and they can also be opened and closed manually. However, in the case of switch 19 its trip means is specifically coordinated with the load characteristics of the transformer and besides being responsive to current it is also made responsive to the temperature of the transformer. One way of doing this is to embed a small bulb 26 (see also FIG. 2) of thermally expansible or vaporizable liquid in the transformer winding. Preferably bulb 26 is placed so that it is thermally responsive to either section of the secondary. This can be done as illustrated in FIG. 6 by placing the bulb 26 between the two secondary sections. A capillary tube 27 extends from bulb 26 through conduit 18' into box 3 to an expansible bellows or other equivalent means 28. When the transformer is overheated bellows 28 will be expanded to trip the switch 19 open. Therefore, switch 19 serves as a transformer secondary protective circuit breaker which is responsive to transformer temperature and current. However, switch 19 also serves as a disconnect switch for disconnecting the transformer from the house, and the same manual means which is used to open and close switch 19 can also be arranged to reset it. The electrical service package can be provided with a lamp or other indicating means for giving an indication that the transformer will be or has been overloaded. This form of indicating means in connection with transformer protectors is old in the art as per Dripps Patent 2,757,360 issued July 31, 1956 and assigned to the same assignee as the instant application. Conventionally the lamp is mounted on the transformer tank which is liquid filled and thermal response is obtained by using a bimetallic current responsive trip element for the transformer protector and indicator which is immersed in the transformer liquid. However, since no transformer liquid is used in the transformer 8 thermal response can be obtained with thermal elements such as 26 and 28 and the lamp can be mounted on the outside of either of compartments 2 or 3 or both.

Still referring to FIG. 6, two lines 29 are brought from the left and right hand upper terminals of meter 16 through panel 16' and conduit 18 into panel 17' to the meter 17. The power in lines 29 is for the home hot water supply and does not go through meter 16 but only through meter 17. They carry 240 volt power and this power is carried by lines 30 from meter 17 through panel 17' and conduit 18' into box 3 where these lines are controlled by switch 22.

Referring now to FIG. 3, the low voltage compartment or customer's distribution box 3 is rigidly connected to the high voltage compartment 2 by rigid conduit 18'. The conduit 18' extends through the back 31 of compartment 2 to the bottom of box 3. The two compartments 2 and 3 and conduit 18' together in effect provide a unitary enclosure for all the necessary electrical equipment between the underground feeder loop and the house lines. The house lines will be connected to the distribution box at terminals such as 32, 33.

In the first form of the invention the box 3 is illustrated as being positioned slightly above compartment 2. The compartment 3 could also be positioned off to one side of compartment 2, or they could be positioned back-to-back, or in still other locations with respect to each other and their unitary enclosure or package concept made complete by a flexible conduit instead of a rigid one. This will be discussed in connection with the FIGS. 7 and 8 forms of invention. Regardless of the disposition of compartments 2 and 3 with respect to each other and their interconnection it is a feature of the invention to coordinate and completely assemble and electrically preconnect at the factory all the electrical equipment which is required for electrical service so that it can be shipped as a package and installed at the home site very simply. Also, the coordination, assembly and preconnection of the equipment is of a permanent nature. That is to say, it does not have to be assembled and installed part by part in the street or at the home site, or disassembled and then installed. Rather, the home builder will receive the package from the factory and all he need do is mount it on the side 1 of the house and bring in the underground cable connections to compartment 2 and the house lines to compartment 3.

In the first form of the invention the package can be mounted by cutting a rather large opening 34 and a smaller one 35 in the outside and inside surfaces of the side 1 of the house. This can be done by cutting away some of the outside sheathing 36 and clapboards 37 and some of the inside sheathing 38 and plaster 39. After this is done the package can be located in position by tilting the bottom of the package to the left slightly and moving the box 3 through the opening 34 and up in-between the sheathing 36, 38 to the opening 35. The front 40 of box 3 can be made removable to facilitate positioning box 3 adjacent opening 35. Alternately, it can be a cover plate which is separate from the box 3 which will seal the edges of opening 35 after it is installed. The back 31 of compartment 2 can have a peripheral flange 41 which can be bolted against the outside of wall 1 so that the whole package is supported in proper position by this flange 41.

In FIG. 3 the box 3 is located slightly above compartment 2 so that both box 3 and meters 16, 17 will be at about eye level for one standing on the floor 42 or ground 43 respectively. In some houses there will be a still larger departure between ground and floor level, such as shown in FIG. 7. In this form of the invention if both box 3 and meters 16, 17 are going to be at eye level the box 3 will have to be positioned further above compartment 2 than in FIG. 3. To take care of all cases part of rigid conduit 18' is replaced by a flexible conduit 18". However, these conduits 18' and 18" in combination with compartments 2 and 3 still in effect provide a unitary enclosure for all of the electrical equipment. That is to say, conduits 18' and 18" can be provided with a plug in socket connection 44 and all of the electrical apparatus coordinated, assembled and electrically preconnected at the factory as heretofore explained. In this form of the invention the box 3 is installed from the inside of the house and the opening 34' in the outside surface of the house is made large enough only to receive the conduit 18' and provide working space for plugging in 18' and 18" with respect to each other. Of course since conduit 18" is not rigid it does not support box 3 so the latter will have to be supported entirely in its wall opening.

The second form of the invention shows that wide latitude is permissible in the positioning of compartments 2 and 3 with respect to each other while still maintaining the idea of a factory assembled electrical service package. For instance, the compartment 2 could be buried underground or off in a shed away from the house and the box 3 could be placed in the house cellar, or both of these things could be done. The only thing that has to be varied as to its details will be the conduit connection between the two compartments. However, this connection can be a plug in socket or other flexible type which will still permit permanently assembling and electrically preconnecting all the components at the factory.

In the third form of the invention shown in FIG. 8 since the house floor and outside ground are at the same general level it is possible to position the two compartments 2 and 3 back-to-back and still have box 3 and meters 16, 17 at eye level. In this form of the invention the package is easier to install than in the first form of the invention since it does not have to be lowered, tilted and then raised in order to bring box 3 up to its opening in the inside surface of the house wall. Also, due to its back-to-back arrangement it can probably stand rougher handling. That is, box 3 can be very strongly supported with respect to compartment 2 by virtue of an auxiliary support structure 45 on the back 31 of compartment 2, whereas in FIG. 3 the box 3 is supported entirely by rigid conduit 18. However, the first and second forms of the invention provide greater flexibility than the third form of the invention with respect to the location of compartments 2 and 3 with respect to each other.

While there have been shown and described particular embodiments of the invention, it will be obvious to those skilled in the art that changes and modifications may be made without departing from the invention, and therefore, it is intended by the appended claims to cover all such changes and modifications as fall within the true spirit and scope of the invention.

What I claim as new and desire to secure by Letters Patent of the United States is:

1. An integrated and preassembled distribution transformer, service entrance and branch circuit panel board for installation through an outside wall of a house comprising in combination, an outdoor high voltage compartment, an entrance door on said high voltage compartment through which access to the interior thereof can only be attained from outside said house, an indoor low voltage compartment, an entrance door on said low voltage compartment through which access to the interior thereof can only be attained from inside said house, a conduit interconnecting said compartments, a voltage step down distribution transformer in said high voltage compartment, a branch circuit panel board including main circuit and individual branch circuit disconnecting devices in said low voltage compartment, and electrical connections between said distribution transformer and said main circuit disconnecting device passing through said conduit.

2. The combination as recited in claim 1 in which control means passing through said conduit actuates said main circuit disconnecting device in response to overtemperature of said transformer.

3. The combination as recited in claim 1 in which said outdoor high voltage compartment is provided with means for mounting it on an outside wall of a house.

4. The combination as recited in claim 1 in which a watt-hour meter socket is mounted on said outdoor high voltage compartment and connected between said distribution transformer and said main circuit disconnecting device.

5. The combination as recited in claim 1 in which a high voltage disconnecting device is mounted in said high voltage compartment and connected to said distribution transformer.

6. The combination as claimed in claim 1, wherein said conduit interconnecting said high and low voltage compartments is rigid, said low voltage compartment being positioned above said high voltage compartment and being supported in said position by said rigid conduit means, and means on both said compartments for mounting said compartments on the side of a house.

7. The combination as claimed in claim 1, wherein said conduit interconnecting said two compartments is flexible, whereby the positioning of said two compartments with respect to each other can be varied.

8. The combination as claimed in claim 1, wherein said conduit interconnecting said two compartments is rigid, and said two compartments are positioned back-to-back.

9. The combination as claimed in claim 5, in which said high voltage disconnect switch has means for operating as an underground feeder loop sectionalizer, said sectionalizer means having means for electrical connection to an underground feeder loop through an opening in said high voltage compartment.

References Cited in the file of this patent

UNITED STATES PATENTS

| | | |
|---|---|---|
| Re. 18,627 | Kleckner | Oct. 18, 1932 |
| 403,308 | Thompson | May 14, 1889 |
| 1,242,962 | Mateer | Oct. 16, 1917 |
| 2,024,742 | Parsons | Dec. 17, 1935 |
| 2,323,252 | Sparkes | June 29, 1943 |
| 2,423,938 | Johansson | July 15, 1947 |
| 2,545,228 | Cranfill | Mar. 13, 1951 |
| 2,553,212 | Rouis | May 15, 1951 |
| 2,642,483 | Wey | June 16, 1953 |
| 2,819,331 | Bladh | Jan. 7, 1958 |

FOREIGN PATENTS

| | | |
|---|---|---|
| 507,285 | Great Britain | June 13, 1939 |